United States Patent [19]

Kakizawa

[11] Patent Number: 5,054,058
[45] Date of Patent: Oct. 1, 1991

[54] TELEPHONE AND TELEPHONE SYSTEM HAVING IMPROVED ONE-TOUCH CALLING

[75] Inventor: Katsuhiro Kakizawa, Kawasaki, Japan

[73] Assignee: Canon Kabushiki Kaisha, Tokyo, Japan

[21] Appl. No.: 569,735

[22] Filed: Aug. 22, 1990

Related U.S. Application Data

[63] Continuation of Ser. No. 250,220, Sep. 28, 1988, abandoned.

[30] Foreign Application Priority Data

Oct. 1, 1987 [JP] Japan ................ 62-245827

[51] Int. Cl.$^5$ ............................... H04M 1/00
[52] U.S. Cl. .................... 379/157; 379/216
[58] Field of Search ............. 379/157, 216, 355

[56] References Cited

U.S. PATENT DOCUMENTS

| | | | |
|---|---|---|---|
| 4,665,545 | 5/1987 | Galensky et al. | 379/157 X |
| 4,759,056 | 7/1988 | Akiyama | 379/216 X |
| 4,825,461 | 4/1989 | Kurita et al. | |
| 4,833,705 | 5/1989 | Kobayashi. | |

FOREIGN PATENT DOCUMENTS 59-161993 9/1984 Japan ................ 379/157
63-129759 6/1988 Japan ................ 379/157

OTHER PUBLICATIONS

Hank Strobel, "Intelligent Telephone Sets", *Telecommunications*, Dec. 1980, pp, 59–61.

*Primary Examiner*—Jin F. Ng
*Assistant Examiner*—Stella L. Woo
*Attorney, Agent, or Firm*—Fitzpatrick, Cella, Harper & Scinto

[57] ABSTRACT

Two telephone numbers, one for an outside call and one for an extension call, are registered for each of a plurality of one-touch buttons through a procedure the same as that used in placing a call conventionally and without providing new buttons. When an input designating an outside call is made before pressing a one-touch button, the party corresponding to the outside telephone number is called. When an input designating an outside call is not made before pressing a one-touch button, an extension telephone corresponding to the extension call telephone number is called. Since the same one-touch call designating button can thus be used for both an extension call and an outside call, many telephone numbers can be registered with a small number of buttons.

8 Claims, 3 Drawing Sheets

|  12a  |  12b  |  12c  |
|-------|-------|---------|
| B-1   | 40    | 7582111 |
| B-2   | 45    | 7203031 |
| ~~~   | ~~~   | ~~~     |
| B-(n-2) | 51  | 2108111 |
| B-(n-1) | 55  | 7118311 |
| B-n   | 58    | 7588086 |

FIG. 2

TELEPHONE AND TELEPHONE SYSTEM HAVING IMPROVED ONE-TOUCH CALLING

This application is a continuation of application Ser. No. 07/250,220 filed Sept. 28, 1988, now abandoned.

BACKGROUND OF THE INVENTION

This invention relates to a telephone and telephone system capable of transmitting the telephone number of a called party by pressing a single button.

In conventional telephone systems capable of transmitting a telephone number in response to depression of a single button, a plurality of telephone numbers of parties that are frequently called are registered beforehand in such a manner that one telephone number corresponds to a single button. In the execution of processing for placing a call to a desired registered party, merely pressing the button for which the telephone number of the party has been registered transmits the corresponding telephone number signal to the telephone line in automatic fashion.

In the prior-art system, however, one telephone number of a party to be called corresponds to one button. This means that the number of telephone numbers capable of being registered is decided by the number of buttons. In order to increase the number of telephone numbers that can be registered, the number of buttons must be increased, thereby raising cost.

SUMMARY OF THE INVENTION

Accordingly, an object of the present invention is to provide a telephone and a telephone system capable of registering and automatically transmitting a large number of telephone numbers of parties to be called without increasing the number of buttons with which the telephone is equipped.

According to the present invention, the foregoing object is attained by providing a telephone comprising: number storing means for storing a plurality of specific telephone numbers in advance; number designating means for designating a specific telephone number stored in the number storing means; and transmitting means for transmitting information indicative of the specific telephone number designated by the number designating means to a connecting line, the number designating means having one-touch call number designating buttons each of which is capable of designating two telephone numbers, one for an extension call and one for an outside call, and extension (example P.B.X.)/outside (example central office lines) line designating means.

According to the present invention, the foregoing object is attained by providing a telephone system comprising: a telephone having number storing means for storing a plurality of specific telephone numbers in advance, number designating means for designating a specific telephone number stored in the number storing means, and transmitting means for transmitting information indicative of the specific telephone number designated by the number designating means to a connecting circuit, the number designating means having one-touch call number designating buttons each of which is capable of designating two telephone numbers, one for an extension call and one for an outside call, and extension/outside line designating means, the same one-touch call number designating button being usable for both outside calls and extension calls; and an exchange control unit, which is capable of connecting a plurality of telephone lines and the telephone connecting lines, for executing channel forming processing to form a channel between the first-mentioned telephone and another telephone or connecting telephone line in accordance with the telephone number information from the first-mentioned telephone.

In another aspect of the invention, there is provided a telephone system comprising: a telephone having one-touch call number designating buttons each of which is capable of designating two telephone numbers, one for an extension call and one for an outside call, and an extension/outside line designating button; number storing means, which is capable of accommodating a plurality of telephone lines and a plurality of telephone connecting lines, for storing beforehand two designated telephone numbers for extension calls/outside calls corresponding to each one-touch call number designating button for every connected telephone; and channel forming means which, in accordance with button input information from a connected telephone, reads out a designated telephone number stored in the number storing means and executes channel forming processing to form a channel with another telephone or a connected telephone line.

In the above-described arrangement, the same one-touch call number designating button is used for both an outside call and extension call, thereby making it possible to register many call telephone numbers with few buttons.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing the correlation between one-touch buttons and registered telephone numbers in the illustrated embodiment.

DESCRIPTION OF THE PREFERRED EMBODIMENT

An embodiment of the present invention will now be described in detail with reference to the drawings.

Figure 1:
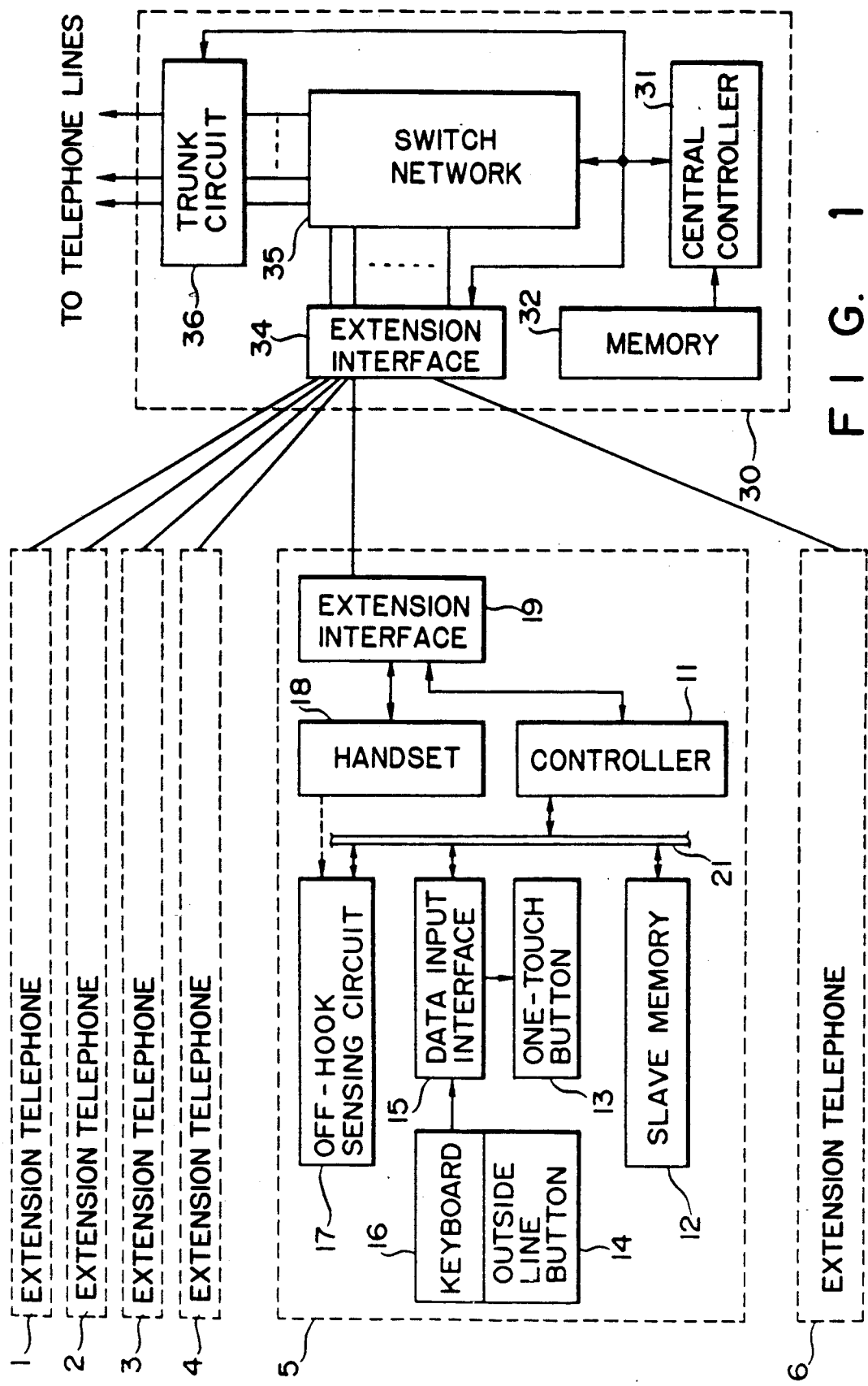
FIG. 1 is a block diagram of an embodiment of the present invention.

FIG. 1 is a block diagram of an embodiment of the present invention, in which numerals 1 through 6 denote pushbutton-type extension telephones and numeral 30 denotes an exchange unit for executing line connection control between a plurality of central office lines (outside telephone lines) and a number of connected extension telephones, connection control among the connected extension telephones, and transfer control, which will be described hereinbelow.

Since the pushbutton-type telephones 1 through 6 are identical in construction, only telephone 5 will be described as a typical example.

The pushbutton-type extension telephone 5 includes a controller 11 for executing overall control of the telephone of this embodiment in accordance with a program stored in an internal ROM. a slave memory 12 for storing a telephone number corresponding to each one-touch button, a plurality of one-touch buttons 13 each for designating and reading out telephone numbers stored in the slave memory 12, an outside line button 14, which is provided on a keyboard 16, for designating whether a called party is an extension or an outside line, a key input interface 15 for interfacing the one-touch buttons 13 and keyboard 16, the keyboard 16, which comprises a ten-key pad for inputting telephone numbers, an off-hook sensing circuit 17 for sensing whether a handset is on or off the hook, the handset 18, an extension interface 19 for interfacing the handset 18 and the exchange unit 30, and an internal bus 21 for connecting the controller 11 to the other components.

The exchange unit 30 includes a central controller 31 for executing overall control of the exchange unit in accordance with a program stored in a memory 32, the memory 32 which, in addition to the abovementioned program, stores various parameters and various control data such as the password of each extension telephone, an extension interface 34 for interfacing each connected extension telephone, a switch network 35 for effecting connection/changeover between the outside telephone lines (pay stations) and the extension telephones, and a trunk circuit 36 for interfacing the outside telephone lines.

It is of course permissible to adopt an arrangement in which telephone number information registered in correspondence with the one-touch buttons 13 and stored in the slave memory 12 is stored not in the extension telephones but in the memory 32 of the exchange unit 30 on an extension phone-by-extension phone basis, with control being performed on the side of the exchange unit 30.

The correspondence between the telephone numbers registered in the slave memory 12 and the one-touch buttons 13 is shown in detail in FIG. 2.

In FIG. 2, numeral 12a denotes one through n number of one-touch buttons (B-1 through B-n), numeral 12b denotes extension telephone number storage areas registered for corresponding ones of the one through n one-touch buttons (B-1 through B-n), and numeral 12c denotes outside line telephone number storage areas registered for corresponding ones of the one through n one-touch buttons (B-1 through B-n).

Accordingly, as shown in FIG. 2, (B-1) corresponds to the "1" one-touch button, "40" is registered as an extension telephone number corresponding to this one-touch button, and "758-2111" is registered as an outside line telephone number corresponding to this one-touch button.

One extension telephone number and one outside line telephone number are registered corresponding to each of the one-touch buttons up to B-n, which is the "n" one-touch button.

Figure 3:
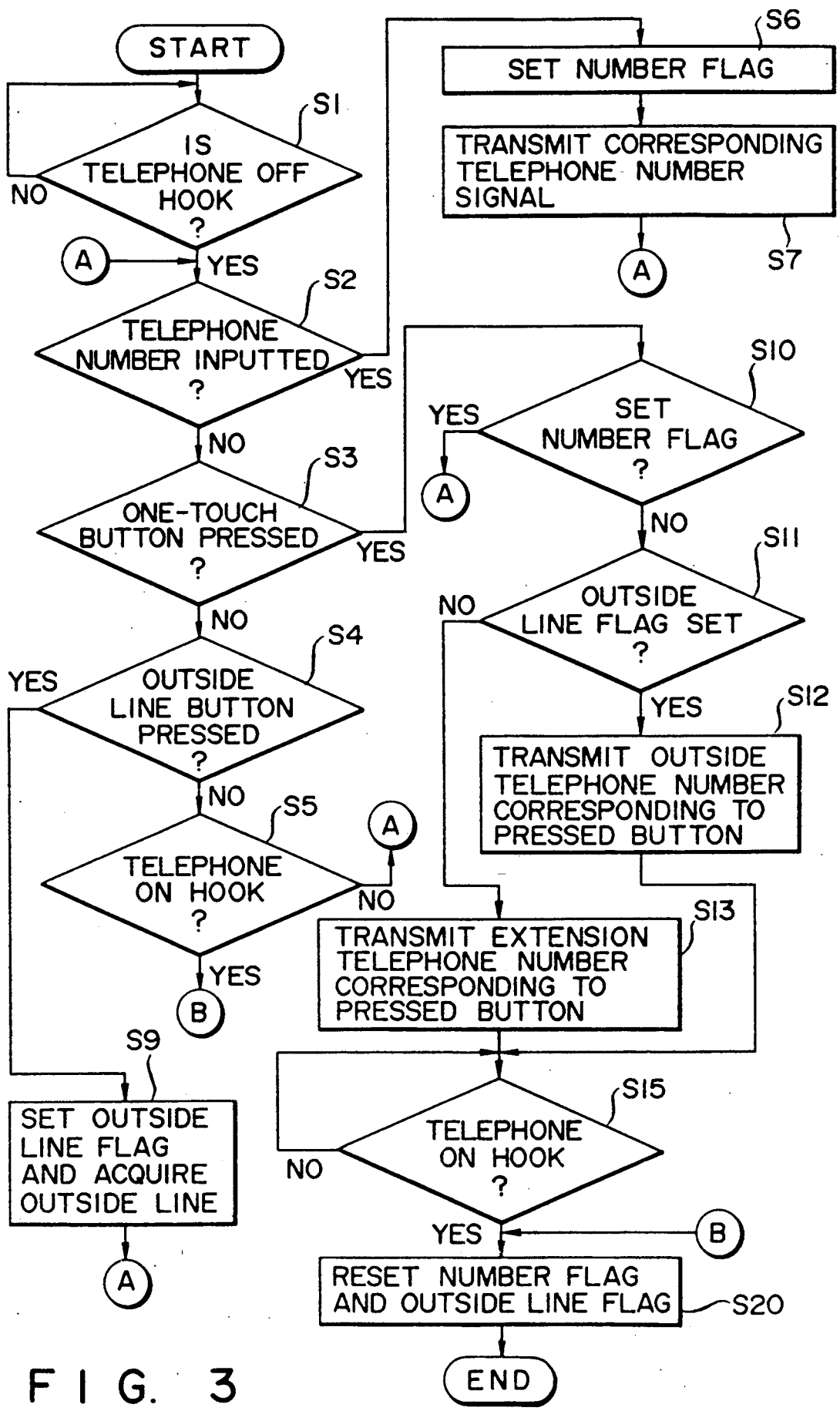
FIG. 3 is a flowchart illustrating call control processing in the illustrated embodiment.

Call processing in accordance with the one-touch buttons of this embodiment arranged as set forth above will now be described with reference to the flowchart of FIG. 3.

First, at a step S1, the off-hook sensing circuit 17 waits for the handset 18 to be lifted from its hook. The handset 18 is lifted when the caller attempts to dial another telephone or in response to an incoming call. When the handset 18 is sensed to have been lifted, monitoring is performed through steps S2 through S5 to determine whether a telephone number has been inputted from the keyboard 16, when an input has been made from the one-touch buttons 13, whether an input has been made from the outside line button 14, and whether the handset 18 has been hung up.

By way of example, assume that an incoming call has been received from another extension line or from an outside telephone line and that the user responds to this call. In a case such as this, a DC loop is formed with a connecting circuit by taking the handset 18 off the hook, as in a well-known telephone operation, this is sensed by the extension interface 34 of the exchange unit 30, and the central controller 31 is so notified. When the central controller 31 senses the extension telephone response to the incoming call, the controller 31 instructs the switch network 35 to form a channel between the calling line and the responding line, thereby establishing a state in which communication is possible. When communication between the parties ends, the handset 18 is hung up.

The handset 18 is hung up in cases where the handset is mistakenly taken off the hook or when the user wishes to redial after having made a mistake in the course of dialing.

When the handset 18 is hung up, therefore, the program proceeds from the step S5 to a step S20, at which the connecting circuit is restored, a number flag and an outside line flag (described below) within the controller 11 are reset, and processing is ended. The program then proceeds to the processing of step S1.

When the handset 18 is taken off the hook in order to place a call, the telephone number of the party to be called must be inputted and transmitted. One way of doing this is to press the telephone number keys on the ordinary keyboard 16. In such case the corresponding telephone number keys are pressed and the program proceeds from the step S2 to a step S6, at which the number flag is set to clarify the fact that the transmission of the telephone number to follow is to be carried out by the telephone number keys. Next, at a step S7, the successively inputted digits of the telephone number are converted into the corresponding telephone number signal and the signal is transmitted to the exchange unit 30 via the extension interface 19. The program then returns to the step S2.

In a case where the telephone number signal designates one of the extension telephones, the exchange unit 30 which has received this signal sends an incoming call signal to the corresponding extension phone and controls the switch network 35 in accordance with the response of the called party to form a channel between the two extension telephones, thereby making communication possible.

If the telephone number signal designates an outside-line telephone, the exchange unit 30 instructs the trunk circuit 36 to acquire an open line (an open outside telephone circuit), controls the switch network 35 to connect this outside line with the calling line and successively transmits the pulses of the telephone number signal to this outside line. Thus, the called party is specified and dialed. When the called party responds, the channel is formed to make communication possible. These channel control operations performed by the exchange unit 30 are well known in the art and need not be described in further detail.

In the illustrated embodiment, the telephones of parties registered for each of the one-touch buttons 13 can be called by pressing the corresponding one-touch buttons. One extension telephone number and one outside telephone number are registered for each one of the one-touch buttons. This means that one of these two telephone numbers must be designated. To designate the outside telephone number, the outside line button 14 is pressed before pressing the particular one-touch button 13. If the outside line button 14 is not pressed before pressing the one-touch button, the number inputted by the one-touch button will be regarded as being the extension telephone number. Accordingly, when the outside line button 14 is pressed, the program proceeds from the step S4 to a step S9, at which the outside line flag is set. The subsequent input from the one-touch button 13 will call the outside line telephone (the central office line). At the same time, the exchange unit causes an outside line acquisition request to be sent to the trunk circuit 36 so that an open line is acquired. The program then returns to the step S2 to prepare for an input from the one-touch buttons 13.

When any of the one-touch buttons 13 is pressed, the program proceeds from the step S3 to a step S10, at which it is determined whether the number flag within the controller 11 has been set. The reason for this is that when the number flag has been set, processing for transmitting a telephone number signal in accordance with a key input from the keyboard 16 is being executed and, hence, an input from the one-touch buttons 13 will be invalidated. When the number flag has been set, therefore, an input from the one-touch buttons is regarded as being an error and is ignored. The program then returns to the step S2.

If the number flag has not been set, the program proceeds from the step S10 to a step S11, at which it is determined whether the outside line flag within the controller 11 has been set. If this flag has been set, this indicates that the call is to an outside line. The program consequently proceeds to a step S12 so that the outside telephone number registered in the outside telephone number area 12c corresponding to the pressed one-touch button (12a) shown in FIG. 2 is read out of the slave memory 12. The telephone number is converted into the corresponding telephone number signal the pulses of which are successively transmitted to the exchange unit 30. For example, when the "1" one-touch button (B-1 in FIG. 2) is pressed, "758-2111", which has been registered in the outside telephone number area 12c, is selected and transmitted.

The switch network 35 in the exchange unit 30 is instructed to send the pulses of this telephone number successively to the telephone line previously acquired. When there is a response from the called party, communication is made possible. This is followed by step S15, at which the system waits for the handset 18 to be hung up at the end of the conversation. When the handset 18 is hung up, the program proceeds to the step S20.

If there is no open line available for acquisition when the outside line button 14 is pressed in the outside line call processing, no transmission of the telephone number takes place and the extension interface 34 outputs a busy signal. This is confirmed from the handset 18 by the user, who thenceforth gives up on the call and hangs up.

If it is found at the step S11 that the outside line flag has not been set, this indicates that the call is to one of the extension telephones and, hence, the program proceeds to a step S13, at which the extension telephone number registered in the extension telephone number area 12b corresponding to the depressed one-touch button (12a) shown in FIG. 2 is read out of the slave memory 12. This telephone number is converted into the corresponding telephone number signal, the pulses whereof are successively sent to the exchange unit 30. For example, when the "1" one-touch button (B-1 in FIG. 2) is pressed, "40" registered in the extension telephone number area 12b is selected and transmitted.

In accordance with the transmitted telephone number signal, the exchange unit 30 controls the switch network 35 to select the corresponding extension telephone and output the call signal. When there is a response, the exchange unit 30 forms a channel between the two telephone lines to make communication possible. The program then proceeds to the step S15, where monitoring is performed to wait for the end of the conversation.

In the description given above, the one-touch button area 12a is contained in the slave memory 12. However, it is permissible to adopt an arrangement in which the buttons are retrieved by correlating the one-touch buttons 1 through n with relative positions from the beginning of a correspondence table without including the names of the buttons.

In a case where the telephone number correspondence table is provided in the memory 32 of the exchange unit 30 and not in the slave memory 12, control information corresponding to each one-touch button is transmitted from the extension telephones and a correspondence table of the corresponding extension telephone is selected by the central controller 31, thereby specifying the telephone number to be called.

In accordance with the illustrated embodiment as described above, the telephone numbers of two parties to be called can be registered for one one-touch button without providing new buttons and through a procedure the same as that used in the conventional calling operation. This has the effect of simplifying dialing without raising cost.

In accordance with the present invention as described above, the same one-touch call number designating button is used for both extension calls and outside calls. This makes it possible to register many telephone numbers with a small number of buttons.

As many apparently widely different embodiments of the present invention can be made without departing from the spirit and scope thereof, it is to be understood that the invention is not limited to the specific embodiments thereof except as defined in the appended claims.

What is claimed is:

1. A telephone comprising:
   numbers storing means for storing a plurality of specific telephone numbers including both extension call numbers and outside call numbers in advance;
   number designating means for designating a specific telephone number stored in said number storing means; and
   transmitting means for transmitting information indicative of the specific telephone number designated by said number designating means to a connecting line;
   said number designating means having one-touch call number designating buttons and an outside line designating button,
   wherein, when one of said one-touch call number designating buttons is pushed without the outside line designating button being pushed, one of said extension call numbers corresponding to said pushed one-touch call number designating button is dialed, and
   when one of said one-touch call number designating buttons is pushed after the outside line designating button is pushed, one of the outside lines is seized and one of said outside line call numbers corresponding to said pushed one-touch call number designating button is dialed.

2. The telephone according to claim 1, wherein said number storing means stores an extension call number and an outside line call number correspondingly for each one-touch call number designating button.

3. The telephone according to claim 1, wherein said number designating means selects an outside call number as an outside call when there is an outside line designating input from the outside line designating button before there is an input from a one-touch call number designating button, and selects an extension call number upon deciding that an extension call has been made when there is no outside line designating input before there is an input from a one-touch call number designating button.

4. A telephone system comprising:
a telephone which includes:
number storing means for storing a plurality of specific telephone numbers including both extension call numbers and outside call numbers in advance;
number designating means for designating a specific telephone number stored in said number storing means; and
transmitting means for transmitting information indicative of a specific telephone number designated by said number designating means to a connecting line; and
an exchange control unit which is capable of connecting a plurality of telephone lines and the telephone connecting line, for executing channel-forming processing to form a channel between said telephone and another telephone or connecting telephone line in accordance with the telephone number information from said telephone,
said number designating means having one-touch call number designating buttons and an outside line designating button,
wherein, when one of said one-touch call number designating buttons is pushed without the outside line designating button being pushed, one of said extension call numbers corresponding to said pushed one-touch call number designating button is dialed, and
when one of said one-touch call number designating buttons is pushed after the outside line designating button is pushed, one of the outside lines is seized and one of said outside line call numbers corresponding to said pushed one-touch call number designating button is dialed.

5. The telephone according to claim 4, wherein said number storing means stores an extension call number and an outside line call number correspondingly for each one-touch call number designating button.

6. The telephone according to claim 4, wherein said number designating means selects an outside call number as an outside call when there is outside line designating input from the outside line designating button before there is an input from a one-touch call number designating button, and selects an extension call number upon deciding that an extension call has been made when there is no outside line designating input before there is an input from a one-touch call number designating button.

7. A telephone system comprising:
a telephone having one-touch call number designating buttons each of which is capable of designating two telephone numbers, one for an extension call over an extension line and one for an outside call over an outside line, and an outside line designating button; and
exchange control unit which includes:
number storing means, which is capable of accommodating a plurality of telephone connecting lines and a plurality of telephone connecting lines, for storing beforehand two designated telephone numbers for an extension call and an outside call, respectively, corresponding to each one touch call number designating button for every connected telephone; and
channel forming means which, in accordance with outside line designating button input information from a connected telephone, reads out a designated telephone number stored in said number storing means and executes channel forming processing to seize an outside line and form a channel with another telephone or a connected telephone line.

8. The telephone according to claim 7, wherein said channel forming means selects an outside call number as an outside call when there is an outside line designating input from said outside line designating button before there is an input from a one-touch call number designating button, and selects an extension call number upon deciding that an extension call has been made when there is no outside line designating input before there is an input from a one-touch call number designating button.

* * * * *

UNITED STATES PATENT AND TRADEMARK OFFICE
CERTIFICATE OF CORRECTION

PATENT NO. : 5,054,058
DATED : October 1, 1991
INVENTOR(S) : Katsuhiro Kakizawa

It is certified that error appears in the above-indentified patent and that said Letters Patent is hereby corrected as shown below:

COLUMN 2

Line 65, "ROM." should read --ROM,--.

COLUMN 3

Line 15, "abovementioned" should read --above-mentioned--.

COLUMN 6

Line 46, "numbers storing means" should read --number storing means--.

COLUMN 8

Line 24, "exchange control unit" should read --an exchange control unit--.
Lines 26-27, "and a plurality of telephone connecting lines" should be deleted.
Line 30, "one touch" should read --one-touch.

Signed and Sealed this

Eighth Day of June, 1993

Attest:

MICHAEL K. KIRK

Attesting Officer

Acting Commissioner of Patents and Trademarks